United States Patent Office 3,732,241
Patented May 8, 1973

3,732,241
HYDROCARBYL-1-(SUBSTITUTED CARBAMOYL)-2-BENZIMIDAZOLE CARBAMATES
Joseph E. Moore, Richmond, Calif., assignor to Chevron Research Company, San Francisco, Calif.
No Drawing. Filed June 12, 1970, Ser. No. 46,565
Int. Cl. C07d 49/38
U.S. Cl. 260—309.2                    7 Claims

ABSTRACT OF THE DISCLOSURE

Compound of the formula

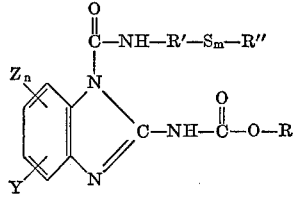

wherein Y is hydrogen, chlorine, methyl, nitro or an alkoxy group of 1 to 4 carbon atoms; Z is hydrogen, halogen or an alkyl group of 1 to 4 carbon atoms; $n$ is from 1 to 3; $m$ is 1 or 2; R is an aliphatic hydrocarbon containing 1 to 4 carbon atoms optionally substituted with halogen, hydroxy, cyano or alkoxy; R' is a divalent alkylene radical of 1 to 4 carbon atoms or a divalent arylene radical of 6 to 10 carbon atoms and R'' is an aliphatic hydrocarbon of 1 to 6 carbon atoms substituted with 0 to 5 halogens, nitro groups, cyano groups or alkoxy groups; aryl or aralkyl of 6 to 14 carbon atoms nuclearly substituted with 0 to 5 halogens, nitro groups, cyano groups or alkoxy groups; carbalkoxymethyl in which the alkyl group is of 1 to 6 carbon atoms and in which the methyl group has 0 to 2 halogen atoms. These compounds are fungicides and ovicides.

BACKGROUND OF THE INVENTION

Field

The present invention concerns benzimidazole derivatives particularly hydrocarbyl 1-(substituted carbamoyl)-2-benzimidazolecarbamates. The benzimidazole carbamates have fungicide and ovicidal activity.

Prior art

U.S. Pat. 2,933,502 discloses chelates of esters of 2-aminobenzimidazole carboxylic acids as having fungicidal activity.

U.S. Pat. 2,933,504 discloses esters of aminobenzimidazole carboxylic acids and their salts and chelates, such as 1-methoxycarbonyl-2-benzimidazole carboxylic acid, methyl ester. The compounds possess fungicidal activity. The group bonded to the nitrogen atoms of the benzimidazole nucleus are either hydrogen or metal ions, complex metal ions or alkoxy carbonyl groups.

U.S. Pat. 3,427,388 discloses monocarboxy esters, dicarboxy esters and tricarboxy esters of 2-aminobenzimidazole as being useful as mite ovicides.

DESCRIPTION OF THE INVENTION

The compounds of the present invention may be represented by the following general formula

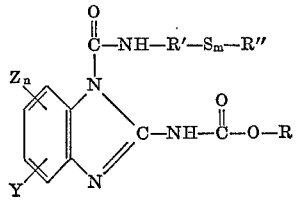

wherein:

Y is hydrogen, chlorine, methyl, nitro or an alkoxy group of 1 to 4 carbon atoms;

Z is hydrogen, halogen, preferably chlorine or bromine, or an alkyl group of 1 to 4 carbon atoms;

$n$ is a positive whole number from 1 to 3 with the proviso that when Z and Y are alkyl their total carbon content to no more than 6 atoms;

$m$ is 1 or 2;

R is an aliphatic hydrocarbon radical group containing 1 to 4 carbon atoms, an aliphatic hydrocarbon radical of 1 to 4 carbon atoms substituted with halogen of atomic number 9 to 35 (fluorine, chlorine or bromine), hydroxy, cyano or an alkoxy group of 1 to 4 carbon atoms;

R' is a divalent alkylene radical of 1 to 4 carbon atoms or a divalent arylene radical of 6 to 10 carbon atoms;

R'' is an aliphatic hydrocarbon group of 1 to 6 carbon atoms substituted with 0 to 5 halogen atoms of atomic number 9 to 35, nitro groups, cyano groups or alkoxy group of 1 to 4 carbon atoms; monocyclic aryl group or monocyclic aralkyl group of 6 to 14 carbon atoms, nuclearly substituted with 0 to 5 halogen atoms of atomic number 9 to 35, nitro groups, cyano groups or alkoxy groups of 1 to 4 carbon atoms; carbalkoxymethyl group in which the alkoxy group is of 1 to 6 carbon atoms and in which the methyl group has 0 to 2 halogen atoms of atomic number 9 to 35. Preferably R'' is an alkyl group of 1 to 6 carbon atoms;

an alkyl group of 1 to 6 carbon atoms substituted with 1 to 5 halogen atoms of atomic number 9 to 35 or 1 to 2 nitro groups; a cycloalkyl group of 3 to 6 carbon atoms; a cycloalkyl group of 3 to 6 carbon atoms substituted with 1 to 5 halogen atoms of atomic number 9 to 35 or 1 to 2 nitro groups; an alkenyl group of 2 to 6 carbon atoms; an alkenyl group of 2 to 6 carbon atoms substituted with 1 to 5 halogen atoms of atomic number 9 to 35 or 1 to 2 nitro groups; a cycloalkenyl group of 3 to 6 carbon atoms; a cycloalkenyl group of 3 to 6 carbon atoms substituted with 1 to 5 halogen atoms of atomic number 9 to 35 or 1 to 2 nitro groups; phenyl; phenyl substituted with 1 to 2 alkyl radicals of 1 to 4 carbon atoms, 1 to 2 alkoxy radicals of 1 to 4 carbon atoms, 1 to 5 halogen atoms of atomic number 9 to 35, 1 to 5 nitro groups; benzyl; benzyl substituted on the aromatic moiety with 1 to 2 alkyl radicals of 1 to 4 carbon atoms, 1 to 2 alkoxy radicals of 1 to 4 carbon atoms, 1 to 5 halogen atoms of atomic number 9 to 35 or 1 to 5 nitro groups; a carbalkoxymethyl group in which the alkoxy group has 1 to 6 carbon atoms; and a carbalkoxymethyl group in which the alkoxy group has 1 to 6 carbon atoms and the methyl group has 1 to 2 halogens of atomic number 9 to 35.

Preferably Y and Z in the above formula will be hydrogen and $n$ will be 3.

Representative aliphatic hydrocarbon groups which R may represent include aliphatic hydrocarbons such as alkyl, alkenyl, alkynyl, cycloalkyl or cycloalkenyl, as well as alkyl, alkenyl, alkynyl, cycloalkyl or cycloalkenyl substituted with halogen, hydroxy, cyano or alkoxy groups. Preferably the number of substituents in the aliphatic hydrocarbon group will not exceed 4. Alkenyl and alkynyl groups will have from 2 to 4 carbon atoms, and the cycloalkyl, cycloalkenyl groups from 3 to 4 carbon atoms.

Thus R may be methyl, ethyl, propyl, isopropyl, butyl, chloromethyl, bromomethyl, fluoromethyl, dichloromethyl, trichloromethyl, vinyl, allyl, butenyl, propargyl, 2-hydroxypropyl, 2-cyanopropyl, 1-methoxyethyl, cyclopropyl, cyclobutyl, etc.

Divalent alkylene radicals or arylene radicals which R' may represent include methylene, ethylene, propylene, butylene and phenylene. Phenylene substituted with 1 to 2 alkyl groups of 1 to 4 carbon atoms are also representative.

Representative groups for R'' include methyl, ethyl, propyl, isopropyl, butyl, pentyl, hexyl, chloromethyl, dichloromethyl, trichloromethyl, 1,1,2,2-tetrachloroethyl, 1,2,2,2-tetrachloroethyl, pentachloroethyl, nitromethyl, cyclopropyl, cyclohexyl, chlorocyclohexyl, nitrocyclohexyl, vinyl, allyl, butenyl, 1,2,2-trichlorovinyl, 1,2-dichlorovinyl, cyclohexenyl, chlorocyclohexenyl, phenyl, o-methylphenyl, m-ethylphenyl, p-methoxyphenyl, o-ethoxyphenyl, p-chlorophenyl, p-nitrophenyl, 2-chloro-4-methylphenyl, carbmethoxymethyl, carbmethoxyhalomethyl, carbethoxymethyl, carbpropoxymethyl, carbbutoxymethyl, benzyl, etc.

The preferred compounds of the present invention will be those wherein $S_m$ is —S—, —S—S; R is alkyl of 1 to 4 carbon atoms, preferably methyl; R' is methylene, ethylene or phenylene; and R'' is alkyl of 1 to 6 carbon atoms, preferably methyl or ethyl, halomethyl, haloethyl, vinyl, halovinyl, phenyl, alkylphenyl, halophenyl, benzyl, carbmethoxymethyl, carbmethoxyhalomethyl (the number of halo (fluorine, chlorine, bromine) substituents may be from 1 to 4; the number of alkyl substituents may be from 1 to 2 and be of 1 to 4 carbon atoms each).

It is understood that the above structure may exist in its tautomeric form, as for example

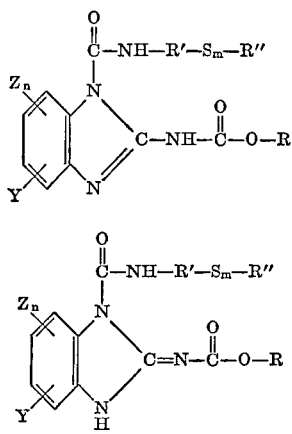

Representative compounds of the present invention include methyl 1-(methylthiomethylcarbamoyl)-2-benzimidazole carbamate,
methyl 1-(methyldithiomethylcarbamoyl)-2-benzimidazole carbamate,
methyl 1-(methyldithioethylcarbamoyl)-2-benzimidazole carbamate,
methyl 1-(chloromethylthiomethylcarbamoyl)-2-benzimidazole carbamate,
methyl 1-(trichloromethyldithioethylcarbamoyl)-2-benzimidazole carbamate,
methyl 1-(ethylthiomethylcarbamoyl)-2-benzimidazole carbamate,
methyl 1-(ethyldithioethylcarbamoyl)-2-benzimidazole carbamate,
methyl 1-(1,2-dichloroethyldithioethylcarbamoyl)-2-benzimidazole carbamate,
methyl 1-(1,1,2,2-tetrachloroethyldithioethylcarbamoyl)-2-benzimidazole carbamate,
methyl 1-(1,2,2-trichloroethyldithioethylcarbamoyl)-2-benzimidazole carbamate,
methyl 1-(vinylthiomethylcarbamoyl)-2-benzimidazole carbamate,
methyl 1-(vinyldithiomethylcarbamoyl)-2-benzimidazole carbamate,
methyl 1-(vinyldithioethylcarbamoyl)-2-benzimidazole carbamate,
methyl 1-(1-chlorovinyldithioethylcarbamoyl)-2-benzimidazole carbamate,
methyl 1-(1,2-dichlorovinyldithioethylcarbamoyl)-2-benzimidazole carbamate,
methyl 1-(1,2,2-trichlorovinyldithioethylcarbamoyl)-2-benzimidazole carbamate,
methyl 1-(phenyldithiomethylcarbamoyl)-2-benzimidazole carbamate,
methyl 1-(phenyldithioethylcarbamoyl)-2-benzimidazole carbamate,
methyl 1-(p-chlorophenylthiomethylcarbamoyl)-2-benzimidazole carbamate,
methyl 1-(p-chlorophenylthioethylcarbamoyl)-2-benzimidazole carbamate,
methyl 1-(methylthiophenylcarbamoyl)-2-benzimidazole carbamate,
methyl 1-(ethyldithiophenylcarbamoyl)-2-benzimidazole carbamate,
methyl 1-(1,1,2,2-tetrachloroethyldithiophenylcarbamoyl)-2-benzimidazole carbamate,
methyl 1-(vinyldithiophenylcarbamoyl)-2-benzimidazole carbamate,
methyl 1-(carbmethoxydichloromethyldithioethylcarbamoyl)-2-benzimidazole carbamate,
methyl 1-(carbmethoxymethylthiophenylcarbamoyl)-2-benzimidazole carbamate,
methyl 1-(carbmethoxymethyldithiophenylcarbamoyl)-2-benzimidazole carbamate,
methyl 1-(carbmethoxychloromethyldithiophenylcarbamoyl)-2-benzimidazole carbamate, etc.

The compounds of the present invention can be prepared as follows.

Hydrocarbyl esters of 2-benzimidazole carboxylic acid may first be prepared by the method disclosed in U.S. Pat. 3,010,968 which is incorporated by reference hereto. Thus, hydrocarbyl esters of 2-benzimidazole carboxylic acid represented by the formula

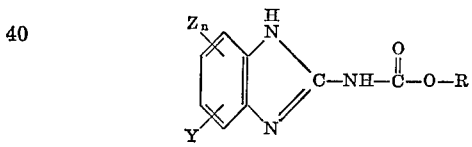

wherein Z, Y, $n$ and R are as described above may be prepared by reacting a mixture of dimethyl sulfate, thiourea and water at reflux temperatures for a time necessary to complete formation of 2-methylthiopseudourea sulfate; next a hydrocarbyl chloroformate and a base such as alkali metal hydroxide are added while the reaction mixture is maintained at about —10 to +50° C. This is followed by adding to the resulting mixture an acid and o-phenylenediamine. The final reaction which results in the production of the hydrocarbyl esters of 2-benzimidazole carbamic acid is generally conducted in the range of 30 to 100° C.

The hydrocarbyl esters of benzimidazole carbamic acid may then be reacted with an appropriate isocyanate according to the following reaction scheme

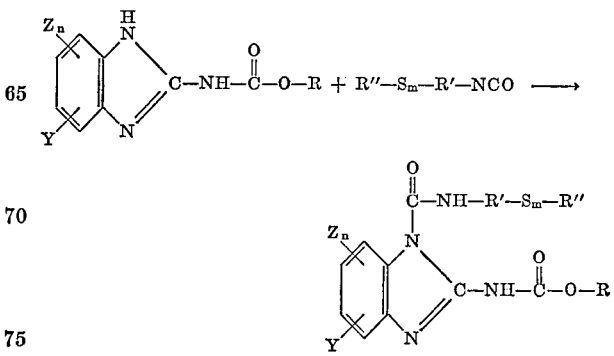

wherein Z, Y, m, n, R, R' and R" are as defined above. The above reaction will generally be carried out in the presence of suitable solvents such as 1,2-dimethoxyethane, dimethylformamide or benzene at a temperature of from 20 to 50° C. for a time of from 0.5 to 3 hours. Stoichiometric amounts of reactants should be used; however, a slight excess of either is permissible.

The desired hydrocarbyl 1-(substituted carbamoyl)-2-benzimidazole carbamate may be recovered by stripping off the solvent. Further purification of the product may be accomplished by crystallization from the suitable solvent, etc.

The isocyanates used in the above reaction with a hydrocarbyl ester of benzimidazole carbamic acid are prepared by either of two general reactions. The first method encompasses the reaction of a heavy metal cyanate, e.g. silver cyanate, with an appropriate halide, thus:

R"—S$_m$—R'—Cl+AgNCO→
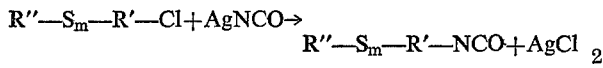
R"—S$_m$—R'—NCO+AgCl wherein R', R" and m are as defined above.

In this reaction, about an equimolar amount of the halide is added to a slurry of the cyanate in a nonaqueous solvent. The resulting mixture is then heated until the reaction is essentially complete. Typical solvents for this reaction include acetonitrile, benzene, ether, etc. About 5 to 15 parts by weight of solvent are used to slurry each part of the heavy metal cyanate. The temperature of the reaction is generally within the range of 40 to 100° C., preferably 50 to 70° C. At these temperatures the reaction is usually completed within 15 to 150 minutes. At the end of the reaction time, the insoluble salts are removed by filtration, and the product is isolated by evaporation of the solvent. Purification, if desired, may be accomplished by distillation.

The second method used to prepare the isocyanate feed stocks is the well-known reaction of a primary amine with phosgene:

R"—S$_m$—R'—NH$_2$+Cl$_2$CO→
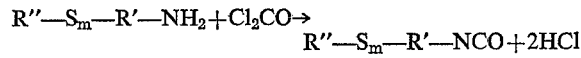
R"—S$_m$—R'—NCO+2HCl wherein R', R" and m have the same meaning as before.

Frequently an amine hydrochloride is used instead of the amine. In either case the amine or amine hydrochloride is mixed with an inert solvent, cooled, and then charged with gaseous phosgene. After all phosgene is added, the reaction is completed by warming to a higher temperature. Typical inert solvents for this reaction include ethylacetate, benzene, xylene, etc. From about 5 to 15 parts by weight of solvent per part of the amine-containing compound are used in this reaction. The temperature at with the phosgene is added is usually below 5° C. and is conveniently at 0° C. Phosgene is usually added in the gaseous form and at least in a molar amount. Frequently excess phosgene, sometimes as much as 100% excess, is added to the reaction mixture. The unreacted phosgene may be recycled. After all the phosgene has been added, the reaction mixture is allowed to warm to ambient temperature and is then heated to the solvent reflux temperature for a period of time sufficient to complete the reaction. The time required for phosgene addition depends on the batch size and cooling efficiency. Phosgene is added at such a rate as to maintain low temperatures. Reaction at elevated temperatures is generally complete in from 1 to 10 hours. The course of the reaction may be followed by measuring the adsorption in the 4.0 to 4.5μ region of the infrared spectra. The product is isolated by evaporation of the solvent and purified by distillation.

The amines used in preparing the isocyanate feed stocks are, in turn, obtained by a variety of processes depending on the nature of R', R" and m.

For compounds in which m=1, the amine may be prepared by the reaction of a mercaptide, e.g. sodium mercaptide with an appropriate α-chloro-ω-amino alkane:

R"—S—Na+Cl-(CH$_2$)$_x$NH$_2$→
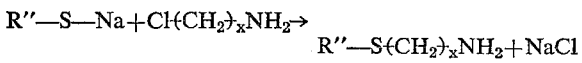
R"—S-(CH$_2$)$_x$NH$_2$+NaCl wherein R" is as defined before and x is a whole number, one or greater, usually 1 to 4. It is understood, of course, that the alkylene group, i.e. —(CH$_2$)$_x$—, of the amino chloride compound may also be branched. For convenience only the straight chain form is written.

The above reaction is carried out in a low molecular weight alcohol solvent, e.g. methanol, ethanol, or isopropanol. A molar amount, based on mercaptan, of an alkoxide such as the sodium alkoxide, is dissolved in the alcohol or is formed in situ by the addition of a molar amount of sodium metal. The quantity of alcohol used is from 5 to 15 parts by weight per part of mercaptan. Then the requisite mercaptan is dissolved in the alcohol, and finally the aminochloride is added carefully. Temperatures of reaction vary from 0 to 100° C., but preferably the ingredients are mixed at ambient temperatures and then heated to the reflux temperature of the alcohol solvent. Reactions are generally completed within 30 to 240 minutes. The product is recovered by evaporation of the solvent after filtration.

To produce amines containing an arylene group with m equaling 1, a similar reaction to that above may be carried out with the exception that an amino substituted thiophenol is used as the mercaptan and an R"—Cl compound is used in place of the amino chloride, R" being the same as defined previously.

For compounds in which m=2, the amine may be preferentially prepared by the reaction of an appropriate sulfenyl chloride with an amino mercaptan or its hydrochloride salt, R"—S—Cl+HS—R'—NH$_2$→
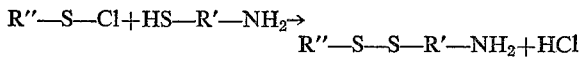
R"—S—S—R'—NH$_2$+HCl wherein R' and R" are as defined before.

In this reaction, the aminomercaptan is dissolved in a low molecular weight fatty acid solvent, and then the sulfenyl halide, preferably dissolved in the same solvent, is added slowly while maintaining the reaction temperature below 20° C. The solvent is preferably glacial acetic acid and is employed in quantities of from 5 to 15 parts by weight per part of aminomercaptan. The preferred reaction temperature is 0-5° C.; although temperatures as high as 15-20° C. are satisfactory. Reaction times are a function of both size and cooling efficiency, but are generally completed within ¼ to 5 hours. The product is isolated by evaporating the solvent after filtration.

The subject invention will be more fully understood by reference to the following examples.

EXAMPLE 1

(a) 10.0 g. of 2-aminoethanethiol hydrochloride were dissolved in 100 ml. glacial acetic acid and stirred at 15–20° C. 20.6 g. of 1,1,2,2-tetrachloroethylsulfenyl chloride were added dropwise over 30 minutes. The mixture was stirred at room temperature overnight, during which time a white solid separated. After filtration and drying, 18.8 g. of 1,1,2,2-tetrachloroethyl 2-aminoethyl disulfide hydrochloride were obtained melting at 140–144° C. Chemical analysis showed:

Calculated (percent): Cl, 11.35. Found (percent): Cl, 11.48.

(b) 10.0 g. of 1,1,2,2-tetrachloroethyl 2-aminoethyl disulfide hydrochloride were suspended in 100 ml. ethyl acetate with stirring at 5–10° C. while 8.0 g. phosgene were bubbled in. The mixture was allowed to warm to room temperature and stirring was continued for 3.5 hours. The mixture was finally refluxed 1.5 hours, during which time the solid mostly dissolved. The mixture was cooled and filtered from a little solid. The solvent was stripped. The residual oil was heated under vacuum until the pressure gauge indicated that no more hydrogen chloride was being evolved. Infrared spectroscopy showed strong absorbence at 4.5μ due to —NCO and no absorbence at 5.7μ due to —C=O. 9.5 g. of viscous, amber, oily 2-cyanatoethyl 1,1,2,2-tetrachloroethyl disulfide were obtained.

(c) 9.5 g. of methyl benzimidazole-2-carbamate were slurried in 100 ml. 1,2-dimethoxyethane and stirred while 15.0 g. 2-cyanatoethyl 1,1,2,2-tetrachloroethyl disulfide were added in one portion. Stirring was continued. The solid mostly dissolved in 30 minutes. The mixture was filtered from a little solid. The solvent was stripped, leaving a solid. The solid was taken up in 100 ml. hot benzene, stirred with activated charcoal and filtered. The clear solution was diluted with 300 ml. hexane. A white solid separated. The solid was filtered and dried. 16 g. of methyl 1-(1,1,2,2-tetrachloroethyldithioethyl carbamoyl)-2-benzimidazole carbamate melting at 134–135° C. were obtained. Chemical analysis showed:

Calculated (percent): N, 11.38; S, 13.03; Cl, 28.81. Found (percent): N, 10.92; S, 13.02; Cl, 28.92.

EXAMPLE 2

(a) 20.0 g. of metallic sodium paraffin dispersion (50%) were dissolved in 200 ml. absolute ethanol with stirring. The mixture was cooled to 5–10° C. and 23.8 g. benzenethiol were added dropwise. Finally, 25.0 g. of 2-chloroethylamine hydrochloride were added in small portions over ten minutes. The mixture was stirred and refluxed for one hour. The mixture was cooled and filtered from salt. The filtrate was stripped. The residual oil was taken up in 100 ml. benzene, treated with activated charcoal and filtered. Dry hydrogen chloride was bubbled into the benzene to saturation. A white solid separated which was filtered and dried. 29.2 g. 2-aminoethyl phenyl sulfide hydrochloride were obtained melting at 114–115° C. Chemical analysis showed:

Calculated (percent): N, 7.38; Cl, 18.69. Found (percent): N, 7.01; Cl, 18.35.

(b) 10.0 g. of 2-aminoethyl phenyl sulfide hydrochloride were suspended in 100 ml. ethyl acetate with stirring at 5–10° C. while 10.0 g. phosgene were bubbled in. The mixture was allowed to warm to room temperature and stirring was continued overnight. The mixture was finally refluxed for 2.0 hours, during which time the solid mostly dissolved. The mixture was cooled and filtered from a little solid. The solvent was stripped. The residual oil was heated under vacuum until the pressure gauge indicated that no more hydrogen chloride was being evolved. Infrared spectroscopy showed strong absorbence at 4.5μ due to —NCO and no absorbence at 5.7μ due to —C=O. 9.0 g., viscous, amber, oily 2-cyanatoethyl phenyl sulfide were obtained.

(c) 9.6 g. of methyl benzimidazole-2-carbamate were slurried in 100 ml. 1,2-dimethoxyethane and stirred while 9.0 g. 2-cyanatoethyl phenyl sulfide were added in one portion. Stirring was continued. The solid mostly dissolved in one hour. The mixture was heated to reflux and filtered from unreacted solid. The solvent was stripped, leaving a solid. The solid was suspended in 100 ml. boiling hexane and benzene added until solution occurred. The solution was treated with activated charcoal, filtered hot and the filtrate cooled. A white solid separated. The soild was filtered and dried. 11.8 g. methyl 1-(phenylthioethylcarbamoyl) - 2 - benzimidazole carbamate melting at 121–123° C. were obtained. Chemical analysis showed:

Calculated (percent): N, 15.13; S, 8.66. Found (percent): N, 14.72; S, 8.28.

Other compounds of the subject invention were prepared by methods similar to that of the above examples. The compounds and their analyses are tabulated in Table I.

TABLE I

| Compound | Elemental analysis, percent by weight | | | | Melting point, °C. |
|---|---|---|---|---|---|
| | S | | Cl | | |
| | Calculated | Found | Calculated | Found | |
| Methyl 1-(4-chlorophenylthioethylcarbomoyl)-2-benzimidazole carbamate | 7.92 | 7.90 | 8.76 | 8.73 | 138.5–140 |
| Methyl 1-(methylthioethylcarbamoyl)-2-benzimidazole carbamate | 10.40 | 9.92 | | | >300 |
| Methyl 1-(4-chlorophenylthiomethylcarbamoyl)-2-benzimidazole carbamate | 8.20 | 7.94 | 9.07 | 8.90 | 162–165 |
| Methyl 1-(methylthiomethylcarbamoyl)-2-benzimidazole carbamate | 10.90 | 10.21 | | | >300 |
| Methyl 1-(1,1,2,2-tetrachloroethyldithiophenylcarbamoyl)-2-benzimidazole carbamate | 11.87 | 10.95 | 26.25 | 24.78 | 160–180 |
| Methyl 1-(trichlorovinyldithioethylcarbamoyl)-2-benzimidazole carbamate | 14.07 | 13.97 | 23.34 | 23.62 | 103–104 |
| Methyl 1-(trichloromethyldithioethylcarbamoyl)-2-benzimidazole carbamate | 14.45 | 13.60 | 23.97 | 21.94 | 128–132 |
| Methyl 1-(1,2,2,2-tetrachloroethyldithioethylcarbamoyl)-2-benzimidazole carbamate | 13.03 | 12.50 | 28.81 | 27.60 | 126.5–128 |
| Methyl 1-(carbmethoxydichloromethyldithioethylcarbamoyl)-2-benzimidazole carbamate | 13.72 | 12.71 | 15.17 | 14.59 | 117–118 |
| Methyl 1-(carbmethoxydichloromethyldithiophenylcarbamoyl)-2-benzimidazole carbamate | 12.44 | 11.65 | 13.76 | 13.10 | 139–141 |
| Methyl 1-(4-tolylthioethylcarbamoyl)-2-benzimidazole carbamate | 8.34 | 8.01 | | | 91–93 |
| Methyl 1-(benzylthioethylcarbamoyl(-2-benzimidazole carbamate | 8.34 | 8.40 | | | 114–116 |
| Methyl 5-chloro-1-(1,1,2,2-tetrachloroethyldithioethylcarbamoyl)-2-benzimidazole carbamate | 12.18 | 11.72 | 33.66 | 32.45 | 83–86 |

The compounds of the present invention exhibit excellent fungicidal activity against a variety of fungi. The following examples indicate the fungicidal activity.

EXAMPLE A

A number of the inventive compounds were evaluated for fungicidal effectiveness by means of the mycelial drop test. This test is designed to measure the fungitoxic activity of fungicidal chemicals in terms of their degree of inhibition on mycelium growth. Each compound to be tested was dissolved in acetone to 250 p.p.m. concentration. Paper discs previously inoculated with equal amounts of particular fungus mycelium were placed on potato dextrose agar medium. The paper discs were treated by applying a precise and equal volume of each of these fungicidal solutions to the center. Following treatment with the fungitoxic chemical, the discs were incubated along with inoculated but untreated control disc at ambient temperatures until such time that these untreated control discs were filled to a certain level with mycelial growth away from the edge of the disc in treated and untreated samples. From this comparison a percent inhibition of growth area was determined. The results of these tests for various compounds of this invention on the particular fungus mycelium are indicated in Table II.

TABLE II

| Compound | Percent control | | |
|---|---|---|---|
| | Pythium [1] | Fusarium [2] | Rhizoctonia [3] |
| Methyl 1-(1.(1,1,2,2-tetrachloroethyldithioethylcarbamoyl)-2-benzimidazole carbamate | 100 | 94 | 92 |
| Methyl 1-(trichloromethyldithioethylcarbamoyl)-2-benzimidazole carbamate | | 98 | 99 |
| Methyl 1-(1,2,2,2-tetrachloroethyldithioethylcarbamoyl)-2-benzimidazole carbamate | | 99 | |
| Methyl 1-(1,2,2-trichlorovinyldithioethylcarbamoyl)-2-benzimidazole carbamate | | 99 | 90 |
| Methyl 1-(methylthioethylcarbamoyl)-2-benzimidazole carbamate | | 100 | 100 |
| Methyl 1-(p-chlorophenylthioethylcarbamoyl)-2-benzimidazole carbamate | | 99 | 96 |

See footnotes at end of table.

TABLE II—Continued

| Component | Percent control | | |
|---|---|---|---|
| | Pythium [1] | Fusarium [2] | Rhizoctoma [3] |
| Methyl 1-(methylthiomethylcarbamoyl)-2-benzimidazole carbamate | | 100 | |
| Methyl 1-(p-chlorophenylthiomethyl-carbamoyl)-2-benzimidazole carbamate | | 97 | |
| Methyl 1-(1,1,2,2-tetrachloroethyldithiophenylcarbamoyl)-2-benzimidazole carbamate | | 97 | 97 |
| Methyl 1-(carbamethoxydichloromethyldithioethylcarbamoyl)-2-benzimidazole carbamate | | 99 | 96 |
| Methyl 1-(carbmethoxydichloromethyldithiophenylcarbamoyl)-2-benzimidazole carbamate | | | 97 |
| Methyl 1-(phenylthioethylcarbamoyl)-2-benzimidazole carbamate | | 100 | 78 |
| Methyl 1-(4-methylphenylthioethylcarbamoyl)-2-benzimidazole carbamate | | 99 | 100 |
| Methyl 1-(benzylthioethylcarbamoyl)-2-benzimidazole carbamate | | 99 | 98 |

[1] *Pythium ultimum.*
[2] *Fusarium oxysporum.*
[3] *Rhizoctonia solani.*

TABLE III

| Compound | Percent control | |
|---|---|---|
| | Monolinia [1] | Alternaria [2] |
| Methyl 1,(1,1,2,2-tetrachloroethyldithioethylcarbamoyl)-2-benzimidazole carbamate | 100 | 100 |
| Methyl 1-(trichloromethyldithioethylcarbamoyl)-2-benzimidazole carbamate | 99 | |
| Methyl 1-(1,2,2,2-tetrachloroethyldithioethylcarbamoyl)-2-benzimidazole carbamate | 100 | 90 |
| Methyl 1-(1,2,2-trichlorovinyldithioethylcarbamoyl)-2-benzimidazole carbamate | 100 | |
| Methyl 1-(1,1,2,2-tetrachloroethyldithiophenylcarbamoyl)-2-benzimidazole carbamate | 100 | |
| Methyl 1-(4-methylphenylthioethylcarbamoyl)-2-benzimidazole carbamate | 90 | |
| Methyl 1-(benzylthioethylcarbamoyl)-2-benzimidazole carbamate | 100 | |

[1] *Monolinia fructicola.*
[2] *Alternaria solani.*

EXAMPLE B

A number of the compounds were also tested for effectiveness against spores by means of a variation of "The Standard Spore Slide-Germination Method for Determining Fungicidal Activity," described in the American Phytopathological Society Journal, volume 33, pages 627–632 (1943). The method is designed to measure the fungitoxic activity of fungicidal chemicals, their activity being expressed in terms of percent inhibition of germination of fungus spores. Each compound toxicant to be tested was dissolved in acetone to a concentration of 100 p.p.m. These solutions were then pipetted into the wells of depression slides and allowed to dry. The wells were filled with a spore suspension of the specified test organism. A 10-fold greater volume of suspension was used than that used to apply the toxicant so that the slide concentration of toxicant was 10 p.p.m. The spores were then incubated in a moist chamber overnight. A group of 100 spores was examined and the number of spores germinated and not germinated was counted and recorded to show the biological activity in terms of the percent germination inhibition. Table III reports the results of this testing.

EXAMPLE C

Compounds of the present invention were also tested to determine their fungicidal value in foliar spray applications against leaf blights and leaf rust.

The leaf blight tests were conducted using tomato Bonny Best plants. The tomato late blight organism was phytophthoria infestans conidia. The tomato plants were sprayed with solutions of the candidate toxicant mixed with acetone, water and a nonionic emulsifier. The plants were then inoculated with the organism and placed in an environmental chamber and incubated at 66–68° F. in 100% relative humidity for an extended period of time (approximately 16 hours). Following the incubation the plants were allowed to dry and then were maintained at a 60–80% relative humidity for approximately seven days. The percent disease control provided by a given candidate toxicant is based on the percent disease reduction relative to untreated check plants. The results are reported in Table IV.

The leaf rust test was made using pinto beans. The pathogen was uronyces phaseoli tipica. The pinto bean plants were sprayed with a solution of the candidate toxicant at a certain concentration in acetone-water mixture containing a nonionic emulsifier. The thus treated plants were inoculated thereafter with the pathogen and then incubated in an environmental chamber for approximately 20 hours at 100% relative humidity and a temperature of 68–70° F. The plants were then removed from the chamber allowed to dry and then maintained in a greenhouse at a 60–80% relative humidity. The rate of infection on the leaves was made after about 11 days. The percent disease control provided by a given candidate toxicant was based on the disease reduction relative to untreated check plants. The results are reported in Table IV.

TABLE IV

| Compound | Percent control | | | |
|---|---|---|---|---|
| | Concentrate, p.p.m. | Tomato late blight | Concentrate, p.p.m. | Bean rust |
| Methyl 1-(1,1,2,2-tetrachloroethyldithioethylcarbamoyl)-2-benzimidazolecarbamate | 250 | 99 | 100 | |
| | 100 | 95 | 40 | |
| | 40 | 94 | 16 | |
| Methyl 1-(p-chlorophenylthioethyl-carbamoyl)-2-benzimidazole carbamate | 250 | 94 | 100 | 99 |
| | 100 | 87 | 40 | 98 |
| | 40 | 35 | 16 | 89 |
| Methyl 1-(methylthioethylcarbamoyl)-2-benzimidazole carbamate | 250 | 48 | 100 | 99 |
| | 100 | 8 | 40 | 95 |
| | 16 | 6 | 16 | 88 |
| Methyl 1-(p-chlorophenylthiomethyl-carbamoyl)-2-benzimidazole carbamate | | | 100 | 97 |
| | | | 40 | 83 |
| | | | 16 | 57 |
| Methyl 1-(methylthiomethylcarbamoyl)-2-benzimidazole carbamate | 250 | 10 | 100 | 92 |
| | | | 40 | 86 |
| | | | 16 | 89 |
| Methyl 1-(1,1,2,2-tetrachloroethyldithiophenylcarbamoyl)-2-benzimidazole carbamate | 250 | 48 | 100 | 99.5 |
| | 100 | 26 | 40 | 97 |
| | | | 16 | 92 |
| Methyl 1-(butylcarbamoyl)-2-benzimidazole carbamate | 250 | 6 | 100 | 97 |
| | 100 | 4 | 40 | 85 |
| | 40 | 4 | 16 | 80 |

For comparison purposes, methyl 1-(butylcarbamoyl)-2-benzimidazole carbamate of the prior art was tested and is shown in Table IV.

It is noted that the compounds of the present invention are remarkably superior to the prior art compound in regards to control of tomato late blight. Also, it is noted that many of the compounds are superior to the prior art compound in control of bean rust.

The compounds of the present invention also have ovicidal activity, particularly aracacide ovicidal activity, as shown in the following example.

EXAMPLE D

To test ovicidal activity, Pinto bean leaves having two-spotted mite (Tetranychus telarius L.) eggs attached thereto were dipped into an alcohol-water solution of the candidate toxicant containing a small amount of nonionic emulsifier. The toxicant concentration was 100 p.p.m. The leaves were dried, and then held at 85° F. for about 7 days. The number of dead eggs were then counted and the percent control determined. The results are reported in Table V.

TABLE V

| Compound | Two spotted mite eggs, percent control |
|---|---|
| Methyl 1-(1,1,2,2-tetrachloroethyldithioethylcarbamoyl)-2-benzimidazole carbamate | 100 |
| Methyl 1-(4-chlorophenylthioethylcarbamoyl)-2-benzimidazole carbamate | 99 |
| Methyl 1-(4-chlorophenylthiomethylcarbamoyl)-2-benzimidazole carbamate | 99 |
| Methyl 1-(methylthiomlthylcarbamoyl)-2-benzimidazole-carbamate | 100 |
| Methyl 1-(1,1,2,2-tretrachloroethyldithiophenylcarbamoyl)-2-benzimidazole carbamate | 100 |
| Methyl 1-(trichlorovinyldithioethylcarbamoyl)-2-benzimidazole carbamate | 99 |
| Methyl 1-(trichloromethyldithioethylcarbamoyl)-2-benzimidazole carbamate | 100 |
| Methyl 1-(1,2,2,2-tetrachloroethyldithioethylcarbamoyl)-2-benzimidazole carbamate | 100 |
| Methyl 1-(carbmethoxydichloromethyldithioethylcarbamoyl)-2-benzimidazole carbamate | 100 |
| Methyl 1-(carbmethoxydichloromethyldithiophenylcarbamoyl)-2-benzimidazole carbamate | 100 |
| Methyl 1-(phenylthioethylcarbamoyl)-2-benzimidazole carbamate | 100 |
| Methyl 1-(4-tolylthioethylcarbamoyl)-2-benzimidazole carbamate | 99 |
| Methyl 1-(benzylthioethylcarbamoyl)-2-benzimidazole carbamate | 100 |

When used as fungicides, the carbamates of this invention will be formulated and applied in fungicidal amounts by conventional art methods to fungi or hosts which are subject to fungus attack, especially vegetative hosts such as plants, plant seeds, etc. The amount used will, of course, depend on several factors such as the host, the type of fungus, the particular carbamate, etc. The carbamates may be combined with inert liquids and solid carriers as powders, solutions, dispersions, etc. for such use.

The carbamates of this invention will generally be admixed with biologically inert liquids or solids in an amount from about .05 to 95 weight percent. Higher or lower amounts, of course, can be used to advantage. Preferably from 1 to 50 weight percent of the composition will be the carbamate. Typical of the liquid carriers which may be admixed with the carbamates of this invention include, in addition to acetone, such liquids as water, kerosene, xylene, alcohols, alkylated naphthylene and glycols. Typical solids which may be incorporated with the carbamates include the natural clays, such as kaolin clays, diatomaceous earth, synthetic fine silica, talc, pyrophyllite, etc.

As indicated above, the carbamates of this invention have ideal mite ovicidal activity. Thus, the compounds are useful in preventing the development of damaging populations of mites or in causing the gradual reduction of existing populations. Mite eggs do not hatch to produce living young if these eggs have been treated with one of these compounds. The active compounds may be applied directly to the host containing the mite eggs, or to the environment wherein mite eggs may be subsequently deposited. Thus, e.g., the compounds may be applied to living plants, such as fruit-bearing trees, vegetable crops, grain seed crops, hay crops, etc. Generally from 0.01 to 100 kilograms of carbamate per 10,000 square meters of foliage may be used. It is, of course, recognized that the amount will depend upon the type of mite to be controlled, the weather conditions, the type of crop, the stage of development of the crop, the interval between applications, and the particular carbamate.

The carbamates used for mite fungicidal control are generally admixed with biologically inert liquid or solid carriers which may be the same as those used for fungicidal compositions. In general, the amount of carbamate to inert carrier will be in the same range as specified above for fungicidal compositions.

The pesticidal formulations of the carbamates of this invention may also contain stabilizers, spreading agents, sticking agents, fillers, other compatible pesticides and the like.

As will be evident to those skilled in the art, various modifications of this invention can be made or followed in the light of the foregoing disclosure and discussion without departing from the spirit or scope of the disclosure or from the scope of the following claims.

I claim:
1. A compound of the formula

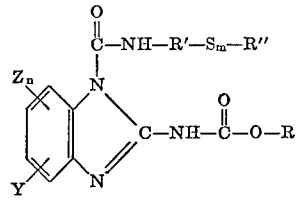

wherein:
Y is hydrogen;
Z is hydrogen, halogen or alkyl of 1 to 4 carbon atoms;
$n$ is 1;
$m$ is 2;
R is alkyl of 1 to 4 carbon atoms;
R' is divalent alkylene of 1 to 4 carbon atoms;
R" is alkyl of 1 to 6 carbon atoms, alkyl of 1 to 6 carbon atoms substituted with 1 to 5 halogen atoms of atomic number 9 to 35, cycloalkyl of 3 to 6 carbon atoms, cycloalkyl of 3 to 6 carbon atoms substituted with 1 to 5 halogen atoms of atomic number 9 to 35, alkenyl of 2 to 6 carbon atoms, alkenyl of 2 to 6 carbon atoms substituted with 1 to 5 halogen atoms of atomic number 9 to 35, cycloalkenyl of 3 to 6 carbon atoms, cycloalkenyl of 3 to 6 carbon atoms substituted with 1 to 5 halogen atoms of atomic number 9 to 35;
phenyl; phenyl substituted with 1 to 2 alkyl radicals of 1 to 4 carbon atoms, 1 to 2 alkoxy radicals of 1 to 4 carbon atoms or 1 to 5 halogen atoms of atomic number 9 to 35, benzyl, benzyl substituted on the aromatic moiety with 1 to 2 alkyl radicals of 1 to 4 carbon atoms, 1 to 2 alkoxy radicals of 1 to 4 carbon atoms or 1 to 5 halogen atoms of atomic number 9 to 35, carbalkoxymethyl in which the alkoxy group has 1 to 6 carbon atoms, and carbalkoxyhalomethyl in which the alkoxy group has 1 to 6 carbon atoms and the halomethyl group has 1 to 2 halogens of atomic number 9 to 35.

2. A compound of claim 1 wherein Z is hydrogen and R' is methylene or ethylene.

3. A compound of claim 1 wherein R is methyl, Z is hydrogen, R' is ethylene, and R" is carbmethoxydichloromethyl, trichloromethyl, trichlorovinyl or 1,1,2,2-tetrachloroethyl.

4. A compound of claim 1 wherein R" is alkyl of 1 to 6 carbon atoms, halomethyl, haloethyl, vinyl, halovinyl, phenyl, alkylphenyl, halophenyl, benzyl, carbmethoxymethyl or carbmethoxyhalomethyl.

5. A compound of claim 1 wherein Z is hydrogen, R' is methylene or ethylene, and R" is alkyl of 1 to 6 carbon atoms, halomethyl, haloethyl, vinyl, halovinyl, phenyl, alkylphenyl, halophenyl, benzyl, carbmethoxymethyl or carbmethoxyhalomethyl.

6. A compound of claim 5 wherein R is methyl.

7. The compound of claim 6 wherein R" is 1,2,2,2-tetrachloroethyl.

References Cited

UNITED STATES PATENTS

| | | | |
|---|---|---|---|
| 3,541,213 | 11/1970 | Klopping | 260—309.2 |
| 3,660,421 | 5/1972 | Osieka et al. | 260—309.2 |

FOREIGN PATENTS

| | | | |
|---|---|---|---|
| 1,812,100 | 6/1970 | Germany | 230—309.2 |

NATALIE TROUSOF, Primary Examiner

U.S. Cl. X.R.

260—453 A, 470, 481, 563 R, 570.5 S, 578, 583 EE,, 608 609 R; 424—273